United States Patent

[11] 3,613,512

[72] Inventor William E. Taft
Los Gatos, Calif.
[21] Appl. No. 866,928
[22] Filed Oct. 16, 1969
[45] Patented Oct. 19, 1971
[73] Assignee The United States of America as represented by the United States Atomic Energy Commission

[54] PNEUMATIC CONTROL ROD DRIVE INCLUDING A SCRAM CUSHION
2 Claims, 2 Drawing Figs.

[52] U.S. Cl. ..................................................... 92/13.8, 92/8, 91/43
[51] Int. Cl. ........................................................ F01b 31/00
[50] Field of Search .......................................... 92/8, 10, 85, 13.8; 176/36; 91/43

[56] References Cited
UNITED STATES PATENTS
| | | | |
|---|---|---|---|
| 3,273,469 | 9/1966 | Doyle | 92/85 |
| 3,162,578 | 11/1964 | Allen | 92/85 X |
| 2,855,899 | 10/1958 | Beaty | 176/36 |
| 2,821,172 | 1/1958 | Randall | 91/43 X |

Primary Examiner—Edgar W. Geoghegan
Assistant Examiner—R. H. Lazarus
Attorney—Roland A. Anderson ABSTRACT: A control rod drive for a nuclear reactor includes a vertically disposed pneumatic cylinder containing a piston having shafts extending above and below the piston. The lower shaft is connected to the control rod and the upper shaft extends through a second, short pneumatic cylinder to terminate in an enlarged head. Air is supplied to the pneumatic cylinder below the piston during normal operation of the reactor to force the enlarged head of the upper shaft against a stop nut on a lead screw, the position of the stop nut on the lead screw determining the position of the control rod within the reactor. To scram the reactor high-pressure air is admitted to the pneumatic cylinder above the piston while the air below the piston is simultaneously exhausted. Deceleration of the control rod is obtained by admitting the high-pressure air used for scramming the reactor through a check valve into the second, short pneumatic cylinder below a free-floating piston therein. When the upper shaft head contacts the piston air is compressed in the second cylinder cushioning the fall of the control rod. A bleed line is provided by passing the check valve and connecting the short cylinder to the scram gasline.

PATENTED OCT 19 1971
3,613,512
Fig-1
Fig-2
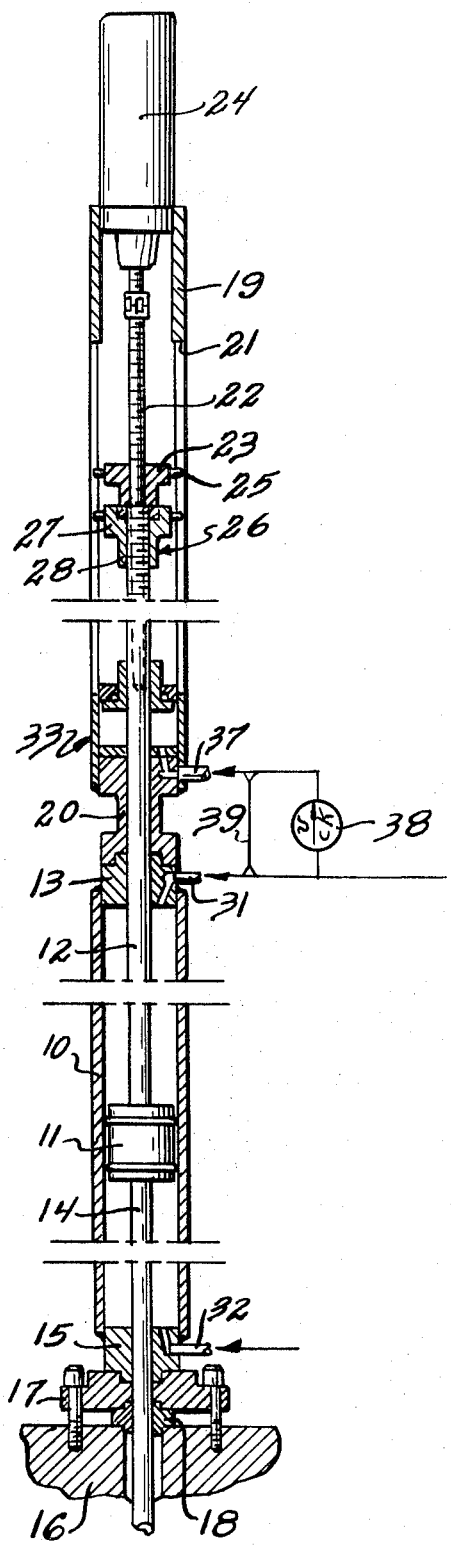
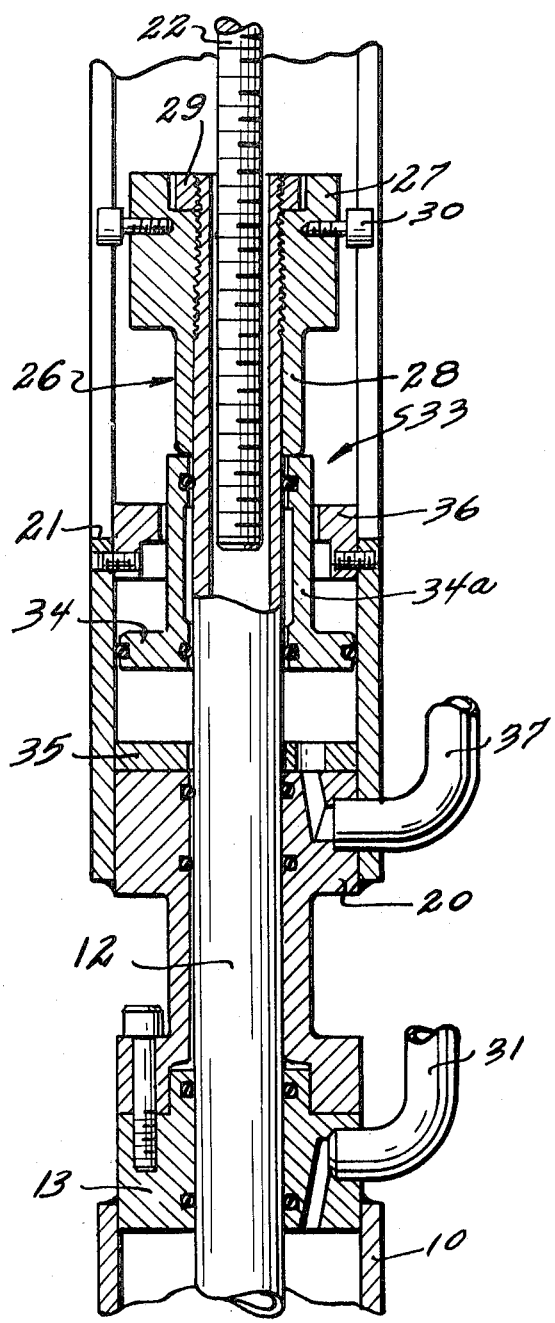
Inventor
William E. Taft
Attorney

PNEUMATIC CONTROL ROD DRIVE INCLUDING A SCRAM CUSHION

BACKGROUND OF THE INVENTION

This invention relates to a control rod drive for a nuclear reactor. In more detail the invention relates to a control rod drive including a novel scram cushion.

Control rods containing a material of high neutron capture cross section are used in most nuclear reactors to adjust the power output of the reactor to a desired value. In many reactors the same control rods used for routine control of the reactor are used to "scram" the reactor or drive the control rods into the reactor to shut down the reactor as rapidly as possible. Since control rods are quite heavy and must be moved over a distance of many feet at very high speeds to be effective under scram conditions, damage to the structure of the reactor and to the control rod will occur unless means are supplied for smoothly decelerating the rod as it approaches the proper position within the reactor.

SUMMARY OF THE INVENTION

This invention is concerned with operating mechanisms for control rods designed to operate in a vertical position in which the force of gravity assists in driving the control rod into the reactor. The invention has for its principal object the provision of a simple and reliable control rod operating mechanism which is capable of positioning a heavy, elongated control rod within a nuclear reactor at any desired location, is capable of moving the control rod into the reactor in the minimum possible time and, in addition, is automatically operable to smoothly decelerate and stop the rod after it reaches an effective position within the reactor. This is accomplished by employing a lead screw and lock nut mechanism to position the control rod within the reactor, pneumatic means to drive the control rod into the reactor under scram conditions and a cushioning device comprising a gas compression chamber filled with high-pressure scram gas wherein a free-floating piston operating against the gas slows down the control rod near the end of its stroke. A bleed line is provided to prevent bounce back of the control rod.

BRIEF DESCRIPTION OF THE DRAWINGS

FIG. 1 is a partial vertical section of a control rod drive according to the present invention showing the drive in normal operating position.

FIG. 2 is an enlarged vertical section of a portion thereof showing the drive in scram position.

DESCRIPTION OF THE PREFERRED EMBODIMENT

Reference is now made to the accompanying drawing wherein the main element of the control rod drive is a vertically mounted pneumatic cylinder 10 enclosing a piston 11 provided with an upper shaft 12 extending through an upper closure member 13 and a lower shaft 14 extending through a lower closure member 15. Lower shaft 14 extends into the reactor head 16 of a nuclear reactor and carries the load of a control rod (not shown). The control rod drive is mounted on reactor head 16 by means of a mounting member 17 which is spaced from the reactor head during normal operation of the reactor by spacer 18. Spacer 18 is a two-part split ring assembly which can be easily removed when the weight of the control rod and drive mechanism is removed from it. This is done to move the control rod shaft down to release the load on the coupling with the control rod. THis must be done before the drive shaft and control rod are uncoupled.

Upper shaft 12 is hollow having an open end and extends up into a cylindrical housing 19 mounted in line to the upper end of pneumatic cylinder 10 and separated therefrom by spacer 20. Housing 19 has opposed longitudinal slots 21 therein extending down to a point somewhat above the bottom of housing 19. A lead screw 22 having a stop nut 23 mounted thereon may be rotated within housing 19 by motor 24. Lead screw 22 is insertable into hollow shaft 12 as shown. Stop nut 23 has rollers 25 mounted on opposite sides thereof which rollers ride within slots 21. Thus the stop nut may be positioned within housing 19 by rotating lead screw 22. A collar 26 having a portion 27 of width slightly less than that of the housing 19 and a lower portion 28 of much smaller diameter is screwed over the top portion of the upper shaft 12 and is retained thereon by lock nut 29. Portion 27 of collar 26 bears rollers 30 on opposite sides thereof which ride in slots 21. This structure prevents rotation of shaft 12 during operation of the reactor. This feature is necessary since the drive shaft and control rod are uncoupled by rotating the drive shaft 45° (following disengagement of the antirotation device).

A source of high-pressure gas is connected to cylinder 10 by line 31 which passes through upper head 13 of cylinder 10. To drive the control rod rapidly into the reactor air or some other gas —is introduced through this line. During normal operation of the reactor air is introduced into cylinder 10 through line 32 passing through lower head 15 of cylinder 10. The pressure used is sufficient to raise piston 11 so that collar 26 presses against stop nut 23. Thus the location of stop nut 13 determines the position of the control rod in the reactor. During a scram, when the control rod is being forced rapidly into the reactor, the gas below piston 11 is exhausted from the pneumatic cylinder 10.

As has been indicated it is essential that a cushion or bumper be provided which will absorb the shock resulting from the rapid insertion of the control rod into the reactor. Scram cushion device 33 accomplishes this result by decelerating the control rod from its downward scram motion during its last few inches of travel. Scram cushion device 33 consists of a piston 34, having a narrow extension 34a on the upper side thereof, riding freely on shaft 12 within a short pneumatic cylinder defined by the lower portion of housing 19, a wear ring 35 on member 20 and an annular member 36 having an opening therein larger than the diameter of narrow extension 34a of piston 34 which is attached to housing 19 just below the bottom of slots 21. When a scram is initiated a portion of the high pressure scram gas is directed to the lower side of piston 34 through line 37 past check valve 38 which line enters the short pneumatic cylinder through member 20 and water ring 35. This forces piston 34 upwardly against annular stop 36. As the control rod is driven downwardly the narrow portion 28 of antirotation device 26 contacts cylindrical extensions 34a of piston 34 which starts to compress the gas in the short pneumatic cylinder and decelerate the scram motion. It will be observed that both extension 34a and portion 28 are narrower than is the opening in annular stop member 36 so that these elements are continuously in contact following initiation of the cushioning action. To prevent bounce back a properly sized bleed line 39 is placed in parallel with check valve 38.

The scram cushion device as described is advantageous since high pressure is in the short pneumatic cylinder at the beginning of the cushion stroke of piston 34 so that not much piston travel is required before an effective cushioning action is created. Another advantage as compared to conventional devices is the relative ease with which the single-bleed orifice can be sized to an accurate diameter to prevent either excessive impact or bounce back.

The embodiments of the invention in which an exclusive property or privilege is claimed are defined as follows:

1. In a control rod drive for nuclear reactor including a pneumatic cylinder, a double-shaft piston slidably mounted in said cylinder, one of said shafts being connected to a control rod, means for adjusting the position of the control rod including a collar on the other shaft, a lead screw and stop nut assembly and a source of gas which urges the collar against the stop nut assembly during normal operation of the reactor, and a source of high-pressure gas connected to said pnuematic cylinder above said piston which is capable of driving the control rod rapidly into the reactor, the improvement comprising means for decelerating the control rod comprising a piston having a portion of small diameter riding freely on the said other shaft within a short cylinder located in line with and between the said pneumatic cylinder and the lead screw and stop nut assembly, an annular closure member having an opening therein larger than the portion of small diameter of the piston disposed at the top of said short cylinder as a stop for said piston, a line provided with a check valve for directing gas from said source of high-pressure gas into said short cylinder below said piston to force the portion of small diameter of the piston against the collar on the other shaft and a bleed line in parallel to said first-mentioned line between said short cylinder and said source of high-pressure gas.

2. A control rod drive for a nuclear reactor comprising a pneumatic cylinder, a piston having shafts at top and bottom thereof slidably mounted in said cylinder, the lower shaft carrying the load of the control rod, the upper shaft extending into a cylindrical housing separated from said pneumatic cylinder by a spacing member, said cylindrical housing having opposed slots therein extending a part of the length thereof, a lead screw having a stop nut mounted thereon rotatable in said second cylinder, said stop nut being guided by opposed rollers riding in said opposed slots, an antirotation collar attached to the top of the shaft including a portion of wide diameter and a portion of narrow diameter, said collar containing in the wide portion thereof a pair of opposed rollers adapted to ride in said slots, a source of high-pressure gas attached to said pneumatic cylinder above said piston and of low-pressure gas attached to said pneumatic cylinder below said piston, said low-pressure gas normally holding the antirotation collar against the stop nut, the high-pressure gas serving to drive the control rod rapidly into the reactor under scram conditions as the low-pressure gas is exhausted, an annular closure member having an opening therein larger than that of the shaft located in the upper cylinder just below the bottom of the slots, a piston freely mounted on said shaft within a short pneumatic cylinder defined by the lower portion of said housing, said piston including a narrow portion of size just sufficient to pass through the opening in said annular closure member and contact the narrow portion of the antirotation collar, a line provided with a check valve for directing gas from said source of high-pressure gas into said short cylinder below said piston and a bleed line bypassing said check valve.